July 11, 1933.  J. A. GRAY  1,918,032
RESILIENT WHEEL
Filed March 23, 1926   3 Sheets-Sheet 1

Inventor: Joseph A. Gray

July 11, 1933.  J. A. GRAY  1,918,032
RESILIENT WHEEL
Filed March 23, 1926  3 Sheets-Sheet 2

Inventor:
Joseph A. Gray

July 11, 1933.  J. A. GRAY  1,918,032
RESILIENT WHEEL
Filed March 23, 1926  3 Sheets-Sheet 3
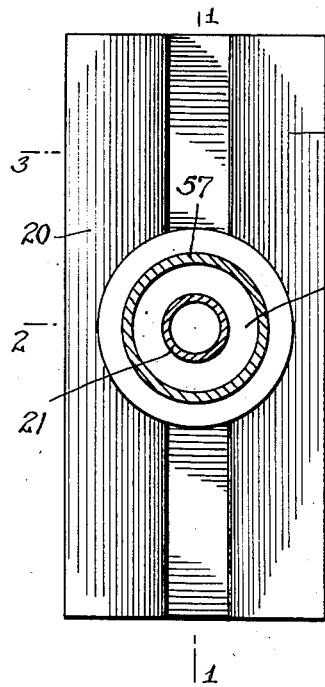
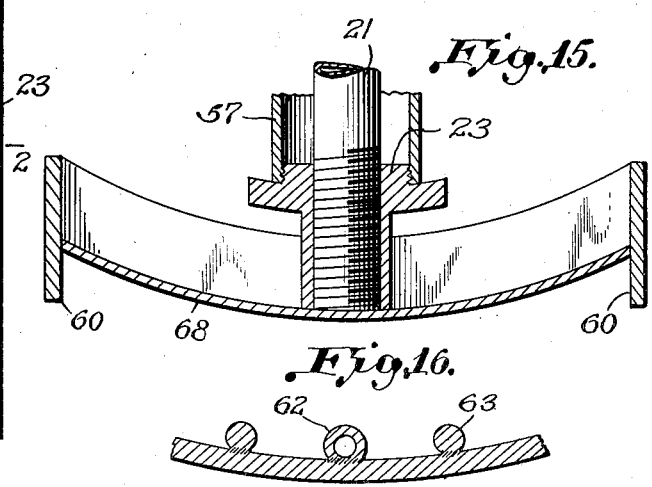
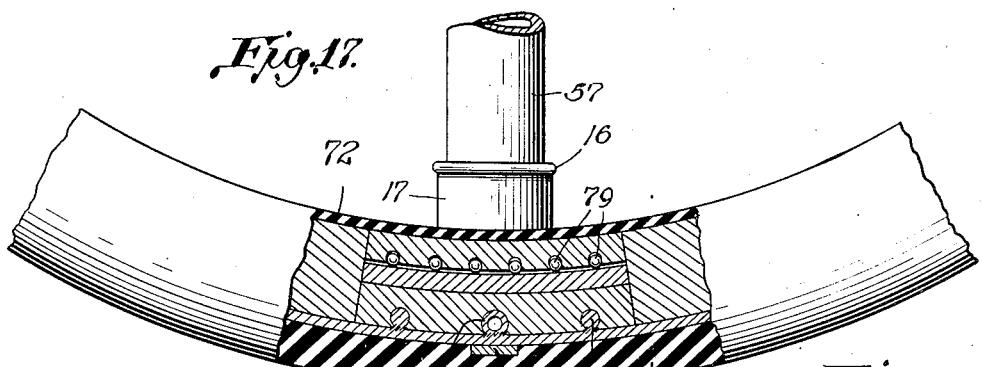
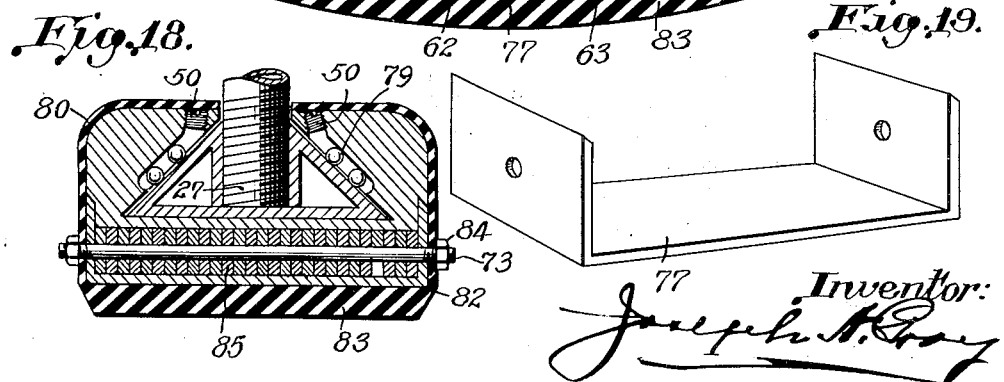
Inventor:
Joseph A. Gray Patented July 11, 1933

1,918,032

UNITED STATES PATENT OFFICE

JOSEPH A. GRAY, OF NORWALK, CONNECTICUT

RESILIENT WHEEL

Application filed March 23, 1926. Serial No. 96,728.

My invention and the added improvements relate to resilient wheels for vehicles, flying machines and other devices of a similiar nature. Its principal object is to provide a resilient wheel that will possess all durable qualities and be free from faults of others. And for aerial uses, one which will compress into more or less of an ellipse, from a heavy downward thrust on the axle, without any unyielding resistance point.

Another object is to provide a spring rim and tire, which will be freely movable radially and circumferentially, and in which one portion of the rim will flex without disturbing other lateral adjacent parts, and retain its normal circumference under normal condition of road surface traversed.

Another object, is a resilient wheel that may be constructed in-expensively, and may be maintained in order at inconsiderable expense; and at the same time, render a number of times more and better service.

I accomplish this by pistons, rod and members, cylinder and rod support spokes and members, a built up pneumatic hub and spoke and a rolling and oscillating spring rim, with a rubber tire vulcanized thereon, and fastened thereto, which may spring radially and circumferentially beyond the normal circumference, to any limited extent, at any point, increasing its ease of motion and eliminating shock, by the features, substantially as herein described, and as pointed out in the claims.

Another object is a resilient wheel, the spring resistance and rigidity of which may be controlled by the changes in construction, increasing the number of spokes, the number of annular sections in the rim, or the weight of material used in the annular sections, or all or any of these methods. While the spring rim shall sustain the load in the normal circular form, without resistance or shock; and while it has construction to give assistance in shock and resistance, from the pressure in the spoke and hub, it is practical for the rim to carry the load retaining its normal form, except when resistance is met.

Figure 1:
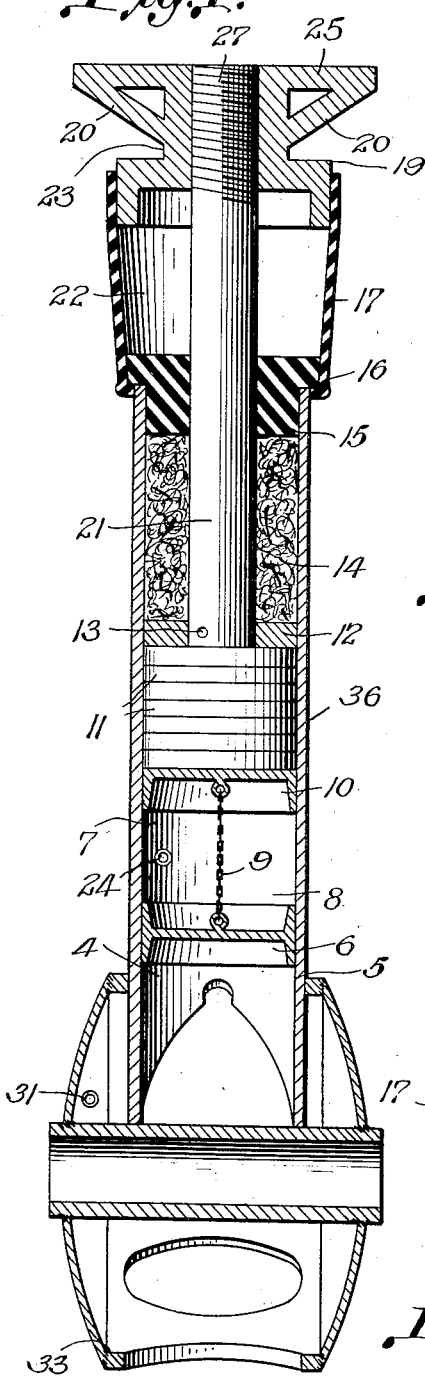
Figure 4:
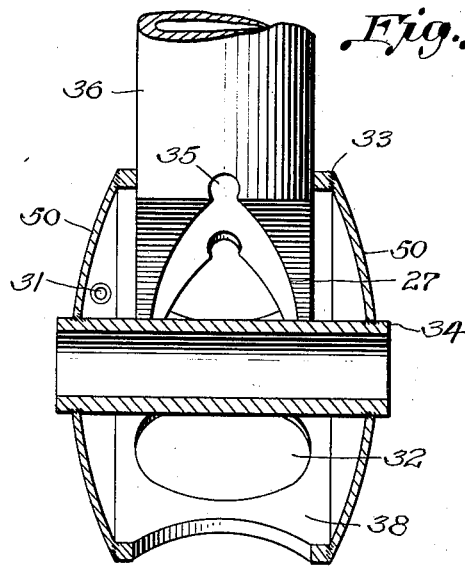
Figure 5:
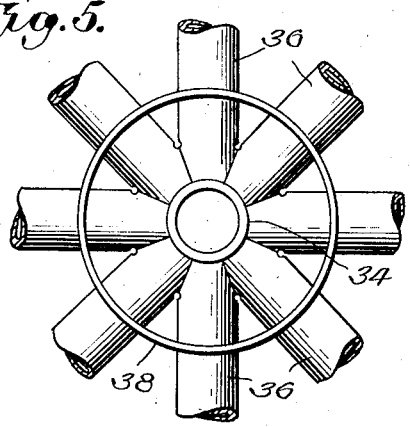
Figures 2, 3:
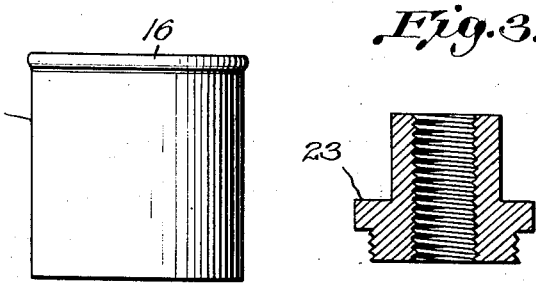
Figure 6:
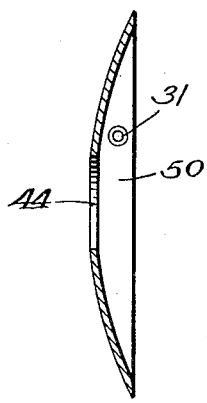
Figure 10:
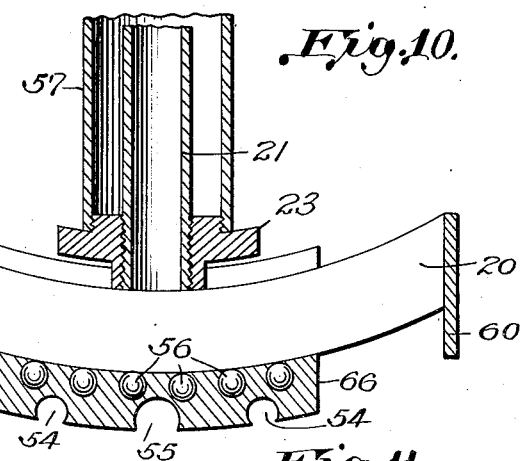
Figure 7:
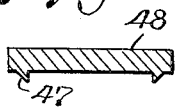
Figure 11:
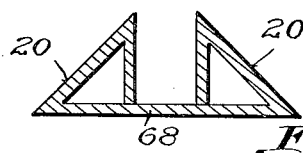
Figure 8:
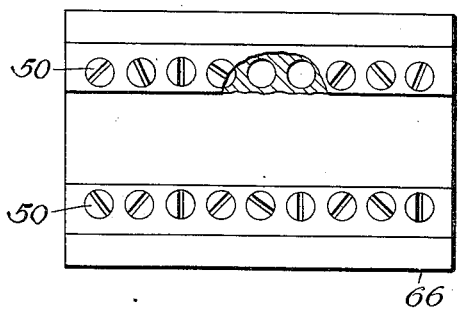
Figure 12:
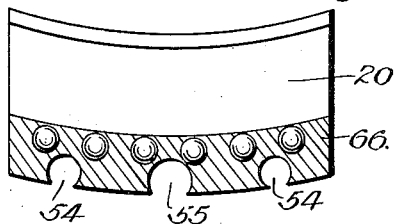
Figure 9:
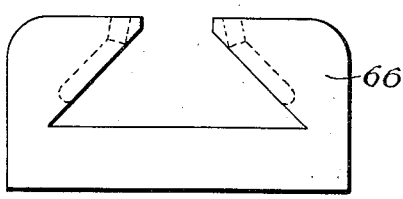
Figure 13:
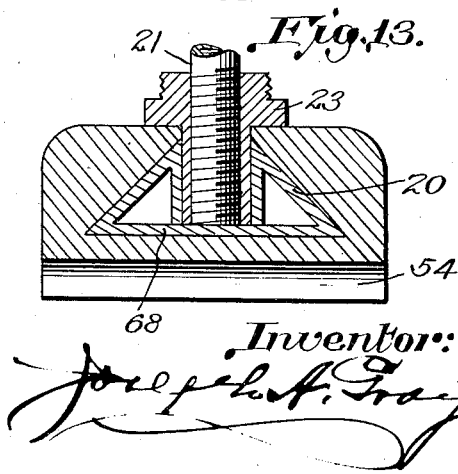

Fig. 1 shows the assembled and fitted parts of the spoke and the contact with the rim and hub ends; Fig. 2 is a side elevation of the rubber casing which closes over the capped end of the spoke cylinders; Fig. 3 is a sectional elevation of a flanged shoe nut to which the piston rod is fastened; Fig. 4 is a transverse section through the hollow built-up hub with a spoke cylinder fastened therein; Fig. 5 is a side view of a hub with the closure disk omitted to show the inner ends of the mitered ends of the spoke ends as fitted together and onto the axle box and fastened; Fig. 6 is a transverse view in section of a closure disk; Fig. 7 is a transverse section of the hub band; Fig. 8 is a top view of a clamp block with the wall of the groove partly broken away; Fig. 9 is an end view of a clamp block; Fig. 10 is a circumferential sectional view through the clamp block, and assembled movable parts fitted together; Fig. 11 is a transverse sectional view of the constructed flanged shoe; Fig. 12 is a circumferential sectional view of the clamp block; Fig. 13 is a transverse sectional view of the clamp block with the flanged shoe and nut at the end of the threaded spoke fastened thereon; Fig. 14 a plain view of the flanged shoe showing the nut and end of the same; Fig. 15 is a circumferential sectional view of the flanged shoe and nut with the bars at the end; Fig. 16 is a front elevation of the fastening loops as welded on the rim hoop; Fig. 17 is a side elevation with a part in section of the spoke and rim connection; Fig. 18 is a transverse view showing the parts assembled and fitted to the rim; and Fig. 19 is an angled tire fastening plate at the clamp block.

Referring to the drawings: similar numbers refer to similar parts throughout.

36 is the cylinder of the spoke of tubing, which may be fastened to the rim of the wheel and the hub and axle box, 34, through the hub band 38. To permit longitudinal movement the cylinder is shortened, leaving a space, 22, between it and the the shoe nut, 23, of any desirable length. The cylinder has a concave end fitting the circular form of the axle box, and is mitered, if necessary, to fit the desired number of spokes to the axle box 34, after passing through the hub band, to which it may be fastened, and when free access for lubricant and air is desired from the spoke to and from the hub cavity, an opening is made in the spoke at 35 by cutting away slightly above the mitering to fit the spokes together; the wall of the tubing of the cylinder in section 5 shows the opening end, 4, of the spoke cylinder, 36, within the hollow spokes and outward of their openings, 35, there are provided the double reverse cup valves, 6, and the reverse cup valve, 10, with the intervening lubricant cup pocket, 8, the cup valves being fastened together and to the piston, 11, by a chain 9. Opening into the lubricant pocket at the portion, 7, of the spoke cylinder is a valve 24, through which the lubricant is introduced and the lubricant pocket filled at any desired pressure; the piston is provided with piston rings, 11, to any desired number; the tubular piston rod, 21, is pierced just outward of the piston at 13, permitting any escaped lubricant and air to pass into the working parts of the rim and not retard the free action of the piston. The lubricating pocket, 14, will also absorb escaping lubricant. The movement of the piston toward the rim is limited by the washer 12; the rim end of the piston-rod is threaded at 27 into the nut in the flanged shoe, 25, or may be fastened therein by any practical way, the rod reciprocating through the cap, 15, on the cylinder, 36, all of which openings and reciprocating parts are protected against water and grit by the rubber casings 17. As shown in Fig. 1, the part of the rubber casing, sealing the rim and the movable spoke parts against water and grit, stretching over the spoke ends and is provided with strong elastic rings 16, at its radially inner end to grip the spoke cylinder.

As shown in Fig. 4, through circumferentially spaced perforations, 32, in the hub band, are received the inner ends of spoke cylinders 36, said spoke cylinders at their mitered inner ends, 27, being fitted to and fastened to the axle box 34; the hub band is supported against lateral strain by closure disks, 50, curved outwardly to give additional capacity to the hollow hub, said closure disks being fastened as by welding, at 33, to the hub band and at their central openings also secured by welding to the axle box in the hollow hub thus built up. As an improvement over the hub of applicant's prior patent, there is fitted a valve, 31, through which lubricant and air to any desired pressure may be introduced; the hub band, 38, as shown in its entire circumferential extent in Fig. 5 and the circular edges 47, against which the peripheral edge of the closure pieces rest, as shown in the cross section of the hub band in Fig. 7, the closure disk having a central opening, 44, through which the axle box passes and onto which it is fastened, the tubular spokes being all of the same diameter.

The piston rod is preferably threaded into the nut of the flanged shoe, 25, by lengthening the distance between the hub and the shoe nut in slightly withdrawing the piston rod out of the shoe nut; the flanged shoe has a broad flat arched bottom, 68, over which the anti frictional members, 56, glide and is concentric in form. The buffers 60 limit the movement of the clamp block. The shoe nut is fastened into a central seating on the flanged shoe which has mitered longitudinal surfaces, 20, and may be formed by bending a piece of metal upon itself as shown in Fig. 11 its greater width giving more strength in lateral strain. These surfaces 20, extend laterally to the angle of the groove in the clamp block 66, which is of dovetailed shape and concentrically fitted with frictional bearings, 79, in the walls. The groove is open at either end of the clamp block and concentric, and at the bottom of the clamp block are the fastening slots for the rim hoops and combined form the wheel rim, the opening, 54, at the right and left of the opening for the binding bolt admit the blanks, 63, and the central opening, the blank 62, and they are cut on a concentric to fit the circumference of the wheel rim. A dovetailed groove in the clamp block, 66, is prepared to receive the anti frictional devices, 56 and 79, the members, 79, are held from displacement by flat machine screws, Fig. 50, which are fitted on a concentric, and the buffers, 60, hold against the clamp block on either end; the blanks 63 and the binding bolt are fastened onto the separate hoops of the rim at the intervals of the clamp blocks and are spaced by the use of common washers, and spacing the hoops of the hops of the wheel rim apart, preventing grinding and enabling vulcanizing the rubber tire on and over the rim hoops, and onto the angle fastening pieces, 77, through which the rim bolt, 73, passes in bolting the assembled rim onto and through the clamp block, 66, supporting and fastening the tread of the tire, 83, the tread surface being concentric. This fastening with the blanks each side the clamp block bolt preventing any chance for lateral swinging movement, as an improvement over my former patent.

The tread of the wheel is a rubber tire, 83; from either side of the tire are formed, as a part of it, flexible annular flares, when in place extend over the angled piece and envelop the clamp block between the spokes, and are cemented together at 72, and extend up around and over the moving parts, and the open end of the cylinder spokes, sealing the whole against water and grit; the rubber tread of the wheel is vulcanized over and through the spring rim sections and forms a combined separate member; all are bound together and upon the clamp block at the spoke ends by the bolt, 73, threaded and fastened with nuts, 84, tightly against the rubber flares and angle piece.

The assembled wheel is a well proportioned resilient vehicle wheel with open spaces between the spokes and long openings between the rubber casing flares, 72, and the outer surface of the hub band, 38. The bolt and nut ends, fastening at the spoke ends protect the rubber tire and flanges from injurious contact with the curb and other obstructions.

In assembling the wheel, the inner ends of the cylinders are secured through the hub band, 38, onto the axle box within the hub, the piston members, 11, and valves 6 and 10, the piston rod 21, in position, the limiting member 12, is placed at the end over the rod, the lubricating packing, 14, is packed around the piston rod, the flanged shoe is slid into the dovetailed groove in the clamp block, the piston rod is fastened into the shoe nut, 23. The lugs 62 and 63, fastened to the annular spring hoop are inserted into the lateral transverse slots, 55 and 54, with a common washer between each. The tread, 83, and the angular fastening piece, 77, are vulcanized and embedded in the tire rubber and fastened by the transverse bolt 73, which passes through the aligned fastening lugs 62, and washers of the assembled rim hoops; the rubber flares, 80, are over the parts of the rim and cemented and fastened at the lap, and the closure rubber is stretched on over the end of the cylinder; lubricant is put into the hub, the oil pockets filled, and air is forced to parts 24 and 31 any desired pressure, while the hub may be made to any desired capacity; the rim moves radially in contact causing the hub to lower relatively, the load is distributed and sustained in hanging from the then top of the rim. The manner of construction of the tire and rim is to facilitate the whole or any part. The easy revolving movement of the wheel is accelerated, and improved over my prior patent by the concentric lines of construction; this is an improvement in its annular movement to any extent desired, and the lateral construction, and the improvement in the buffer ends of the flanged shoe draw together, the interior of the wheel including the spokes moving in one direction, while the rim and the attached parts may all move together in the opposite direction, easing the shock of collision and rough traveling; the loose moving contact between the axle and the rim of the wheel prevents transmission of shock to the vehicle. Waterproof and dust proof glued and fastened flares, 80, 82 and 83, are an improvement over my prior patent.

While the construction described and shown herein, is the preferred construction of my improved wheel, it is to be understood that I do not limit myself to the precise detailed description, but may vary the same within the scope of the appended claims.

What I claim is:

1. A wheel having a built-up hollow hub comprising an axle box and a hub band spaced outwardly therefrom to contain air and lubricant under pressure, a series of cylinders entering and fastened to the hub and freely opening into the hub cavity, compound pistons in said cylinders forming between the parts thereof and the axle box, pockets that are filled with lubricant, said pistons supported by a resilient rim and the contents in the hub under pressure, and in turn supporting the hub; said hub also comprising two convex closure disks secured to the hub band and to the axle box at circular central openings in said disks surrounding and fastening to said axle box, one of the closure disks having a valve through which air and lubricant are admitted.

2. A wheel having a hollow concentric hub, a plurality of spokes radiating therefrom and each consisting of a cylinder spaced from a deformable rim at its other end, and of a tubular piston rod reciprocating in said cylinder and provided with a piston, to the inner end of which is secured a valve secured to other valves by a swiveled chain, said valves forming in the cylinder a pocket filled with lubricant, and piston rings reciprocating through a limiting member and a cylinder closure nut separated from each other by a lubricant pocket acting as a shock cushion, said piston rod having an opening into the interior thereof outside of the piston and having a threaded outer end and opening into and threadedly secured to a circumferentially reciprocating rim member, the piston rods, cylinders and valves reciprocating in the spoke cylinders and cushioned upon lubricant and air in the cylinders and hub, serving to resiliently connect the deformable rim with the hub.

3. A resilient wheel having a spring rim of annular hoop sections assembled, with inward extending lugs in threes fastened to and extending inward from the hoop sections placed side by side, with the lugs extending into transverse slots cut on a concentric in the bottom of the concentric clamp pieces, washers between the lugs spacing the hoop sections, and bounded through the slots by a bolt threaded at either end, through the center lugs at the spoke ends; the clamp pieces provided with concentric dovetailed grooves in the inner surface and provided with antifriction means, with a concentric multiple line of transverse slots in the groove bottom, in which anti-friction members enable the entire rim and clamp pieces to oscillate circumferentially over the concentric bottom of the mitered shoes, at the ends of all the spokes, with buffers at end of the shoe which hold against the clamp pieces, and a center shoe nut into which the end of the piston rod is movably fastened, compound piston members resting upon lubricant and air under pressure in a constructed hub and cylinders, and receding inwardly upon the inward spring of the rim under shock.

4. A resilient wheel which has a rubber tire tread, a spring rim composed of annular spring hoops vulcanized in the tread and serving as a means of fastening the rim and tread together, and fastening the tread onto the wheel, said tread being of any desired thickness and width, and vulcanized through the spaces between the annular hoops and upon the inner side of the sections, and onto the angle fastening piece which secures the hoops assembled, said annular hoops being resilient whereby the tire with the rim may spring inward beyond the normal circumference, and between spokes outward beyond the same, on collision with broken surface in its path or loose objects upon it; said loops and tread being mounted reciprocatingly on spoke ends said spokes comprising compound cylinders resting upon a yielding body of lubricant and air under pressure in the hub and spoke cylinders; on either side of the rubber tread rim extends outward and around the inner circumference of the tread; and is shaped to wrap each side of the moving parts and over the top of at their meeting edges clamp piece and are cemented and fastened together, all surfaces of the tread from contact with grit or water and said extensions of said tread being provided with extending members surrounding the spokes ends to seal in like manner the spokes and the parts carried thereby extending through middle lugs on annular hoops of the rim at the spoke ends at slots extending through the clamping pieces, and extending through flare pieces and nuts threaded on over the same, holding it against the sides of the clamp pieces and the rim parts held in position thereby.

In testimony whereof, I have hereunto set my hand this 22nd day of March, A. D. 1926.

JOSEPH A. GRAY.